United States Patent
Han (10) Patent No.: US 11,858,341 B2
(45) Date of Patent: Jan. 2, 2024

(54) APPARATUS FOR PREVENTING FUEL OVERFLOW OF A VEHICLE FUEL TANK

(71) Applicants: HYUNDAI MOTOR COMPANY, Seoul (KR); KIA CORPORATION, Seoul (KR)

(72) Inventor: Sang Dae Han, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/949,746

(22) Filed: Sep. 21, 2022

(65) Prior Publication Data
US 2023/0087533 A1  Mar. 23, 2023

(30) Foreign Application Priority Data
Sep. 23, 2021 (KR) .................. 10-2021-0125432

(51) Int. Cl.
 *B60K 15/077* (2006.01)
 *F16K 31/22* (2006.01)
 *B60K 15/03* (2006.01)

(52) U.S. Cl.
CPC ............ *B60K 15/077* (2013.01); *F16K 31/22* (2013.01); *B60K 2015/03236* (2013.01); *B60K 2015/03256* (2013.01); *B60K 2015/03328* (2013.01)

(58) Field of Classification Search
CPC ...... F16K 24/044; F16K 24/046; F16K 31/22; B60K 15/077; B60K 15/035; B60K 15/03519; B60K 2015/0772; B60K 2015/0775; B60K 2015/03256; B60K 2015/03289; B60K 2015/03328; B60K 2015/0344; B60K 2015/03453; B60K 2015/03467
See application file for complete search history.

(56) References Cited

U.S. PATENT DOCUMENTS

| | | | | |
|---|---|---|---|---|
| 6,634,341 | B2* | 10/2003 | Crary | B60K 15/035 137/39 |
| 6,901,943 | B2* | 6/2005 | Yamada | F16K 24/044 137/202 |
| 8,109,285 | B2* | 2/2012 | Ehrman | F16K 24/042 137/202 |
| 8,770,218 | B2* | 7/2014 | Tagami | B60K 15/03519 137/202 |
| 8,844,557 | B2* | 9/2014 | Matsuo | F16K 24/044 137/202 |

* cited by examiner

*Primary Examiner* — Hailey K. Do
(74) *Attorney, Agent, or Firm* — LEMPIA SUMMERFIELD KATZ LLC (57) ABSTRACT

An apparatus for preventing fuel overflow of a vehicle fuel tank includes: a valve unit including a valve body, a housing configured to cover a lower part of the valve body, a float mounted on the valve body and configured to slide up and down, a vapor line opened and closed according to a movement of the float, and a fuel inlet hole; a cover unit coupled to and enveloping the housing, the cover unit having a plurality of windows along an outer circumferential surface at a height corresponding to the fuel inlet hole, thereby being formed to allow the fuel to be introduced into the valve unit; and a shielding unit mounted on the cover unit to shield open windows, the shielding unit able to rotate along a turning direction of the vehicle to form an inflow path of the fuel flowing into the fuel inlet hole.

8 Claims, 8 Drawing Sheets

APPARATUS FOR PREVENTING FUEL OVERFLOW OF A VEHICLE FUEL TANK

CROSS REFERENCE TO RELATED APPLICATION

The present application claims priority to Korean Patent Application No. 10-2021-0125432, filed Sep. 23, 2021, the entire contents of which are incorporated herein for all purposes by this reference.

BACKGROUND

Field

The present disclosure relates to an apparatus for preventing fuel overflow of a vehicle fuel tank and, more particularly, to an apparatus capable of preventing fuel overflowing from the fuel tank into a canister from inside a valve body, regardless of a turning direction of a vehicle.

Description of the Related Art

In general, a fuel system of a vehicle is provided with a canister to prevent a fuel boil-off gas generated inside a fuel tank from leaking to the outside. Such a canister is configured to collect the fuel boil-off gas generated in the fuel tank and supply same to an engine.

Such a fuel tank is equipped with a valve configured to discharge the fuel boil-off gas generated inside the fuel tank toward the canister. Such a valve is configured to prevent fuel in a liquid phase from flowing into the canister when there is a concern about fuel leakage due to the vehicle being located in an inclined area, being overturned, or the like.

However, while the vehicle is driving, when sealing performance of the valve is insufficient or there is an abnormal occurrence, or when the fuel tank is filled fully with the fuel, there occurs a problem in that the fuel in a liquid phase overflowing from the fuel tank flows into the canister through the valve.

As described above, when the fuel in a liquid phase flows into the canister, the fuel in a liquid phase flows into the engine from the canister, thereby causing a phenomenon of turning off the engine to occur. In addition, the activated carbon in the canister becomes wet by the fuel in a liquid phase, so the canister is unable to collect the fuel boil-off gas, resulting in a problem that the fuel boil-off gas is released into the atmosphere.

In addition, when overflowing fuel is introduced through the valve in a state in which the fuel tank is filled fully with fuel, since a window hole of the valve is located on a left side, when the vehicle turns to a right side, a possibility of the introduction of the overflowing fuel into the canister is low thanks to a location of the window hole. However, when the vehicle turns to the left, a possibility of the introduction of the overflowing fuel into the canister is high so that a problem of the fuel in a liquid phase flowing into the canister may occur.

The foregoing is intended merely to aid in the understanding of the background of the present disclosure and is not intended to mean that the present disclosure falls within the purview of the related art that is already known to those having ordinary skill in the art.

SUMMARY OF THE DISCLOSURE

Accordingly, the present disclosure has been made keeping in mind the above problems occurring in the related art.

The present disclosure is intended to provide an apparatus for preventing fuel overflow of a vehicle fuel tank, the apparatus having a valve unit capable of being fixed to a valve body and a shielding unit rotatably mounted on the valve unit to complicate an overflowing flow path of fuel. When a vehicle turns along a particular turning direction, the shielding unit rotates by gravity and acceleration to block a fuel inlet hole provided in the valve unit. In this way, when a fuel level in the fuel tank rises in a turning direction, it is possible to prevent in advance the problem of the fuel from flowing into the inside of the valve unit and into the canister, through the fuel inlet hole.

In order to achieve the above objective, according to one aspect of the present disclosure, there may be provided an apparatus for preventing fuel overflow of a vehicle fuel tank. The apparatus includes a valve unit including a valve body, a housing configured to cover a lower part of the valve body, a float mounted on the valve body and configured to slide up and down, and a vapor line selectively connected to a canister side by being opened and closed according to a movement of the float. A fuel inlet hole is provided on a side surface of the housing. The apparatus also includes a cover unit coupled to the housing to envelop the housing, the cover unit including a plurality of windows along an outer circumferential surface thereof at a height corresponding to the fuel inlet hole, thereby being configured to allow fuel to be introduced into the valve unit. The apparatus also includes a shielding unit mounted on the outer circumferential surface of the cover unit to shield open windows and configured such that, when mounted on the cover unit, the shielding unit rotates along a turning direction of a vehicle to form an inflow path of the fuel flowing into the fuel inlet hole.

In this example, when rotated to face the fuel inlet hole by the turning direction, the shielding unit may shield the windows, thereby blocking the fuel from being directly introduced through the fuel inlet hole.

In addition, when rotated in an opposite direction to the fuel inlet hole by the turning direction, the shielding unit may shield the windows, thereby allowing the fuel to be introduced into the fuel inlet hole by passing between an inner circumferential surface of the cover unit and an outer circumferential surface of the housing while being decelerated.

In addition, the shielding unit may include a body portion mounted on a mounting area of the cover unit having the windows, and coupling protrusion parts protruding from an upper portion and a lower portion of the body portion, respectively, and configured to be inserted into latching grooves of the mounting area, respectively.

Such a body portion mounted on the mounting area of the cover unit may have a length shorter than a circumferential length of the cover unit when opposite end parts thereof are spaced apart from each other.

In addition, each of the coupling protrusion parts may have a width shorter than a width of an interior of associated one of the latching grooves, thereby allowing the body portion to be rotatable in the mounting area by gravity and acceleration acting thereon in the turning direction.

The cover unit may have a shape corresponding to a diameter of the housing. Latching members protruding from the housing may be positioned to be hooked to guide grooves provided on an outer circumferential surface of the cover unit, respectively, thereby allowing fixing of the cover unit to the housing at coupling positions.

The cover unit may have a diameter larger than the diameter of the housing such that an inner circumferential surface thereof may be spaced apart from an outer circumferential surface of the housing when the latching members are hooked on the guide grooves, respectively.

As described above, the present disclosure is provided with a valve unit capable of being fixed to a valve body and a shielding unit rotatably mounted on the valve unit to complicate an overflowing flow path of fuel, so that there is an effect of reducing a possibility for the fuel introduced into the valve unit to be guided to be overflowed to the canister.

In addition, according to the present disclosure, when the vehicle turns along a particular turning direction, the shielding unit rotates by gravity and acceleration to block a fuel inlet hole provided in the valve unit. Accordingly, when the fuel level in the fuel tank rises in a turning direction, there is an effect of preventing in advance the problem of the fuel from flowing into the inside of the valve unit and the canister, through the fuel inlet hole.

In addition, the present disclosure can commonly apply a configuration including the cover unit and the shielding unit to the inside of the fuel tank in which the valve unit having the same diameter as the cover unit and the shielding unit is mounted, so there is an effect of realizing ease of manufacture and also reducing costs, at the same time.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION OF THE DISCLOSURE

Hereinafter, an embodiment of the present disclosure is described in detail with reference to the accompanying drawings.

Advantages and features of the present disclosure and a method of achieving same should become apparent with reference to the embodiments described below in detail in conjunction with the accompanying drawings.

However, the present disclosure is not limited by the embodiments disclosed below but may be implemented in a variety of different forms, only the present embodiments are provided to complete the inventive concept of the present disclosure and to completely inform the scope of the disclosure to those of ordinary skill in the art to which the present disclosure belongs, and the present disclosure will only be defined by the scope of the claims.

In addition, in the description of the present disclosure, when it is determined that related known techniques may obfuscate the gist of the present disclosure, a detailed description thereof is omitted.

Figure 1:
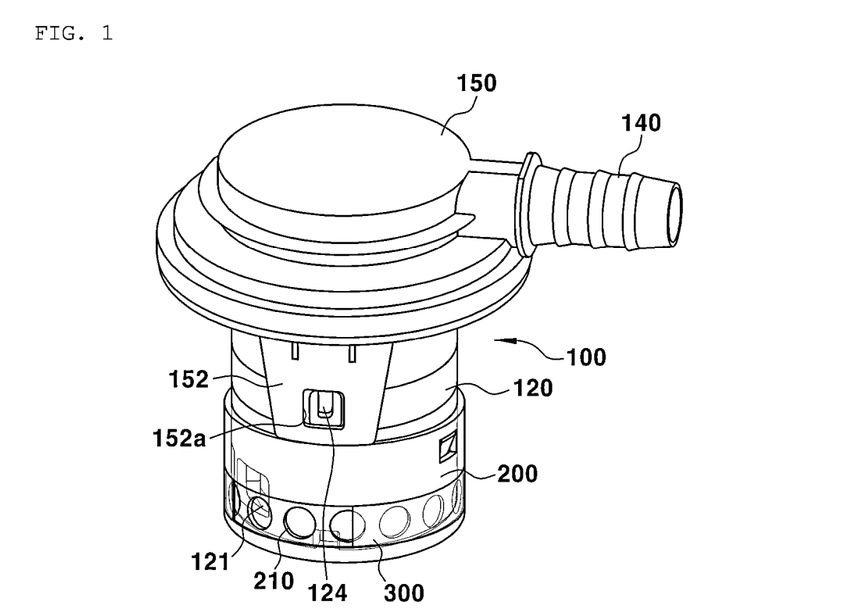
FIG. 1 is a view showing an apparatus for preventing fuel overflow of a vehicle fuel tank according to an embodiment of the present disclosure.
Figure 2:
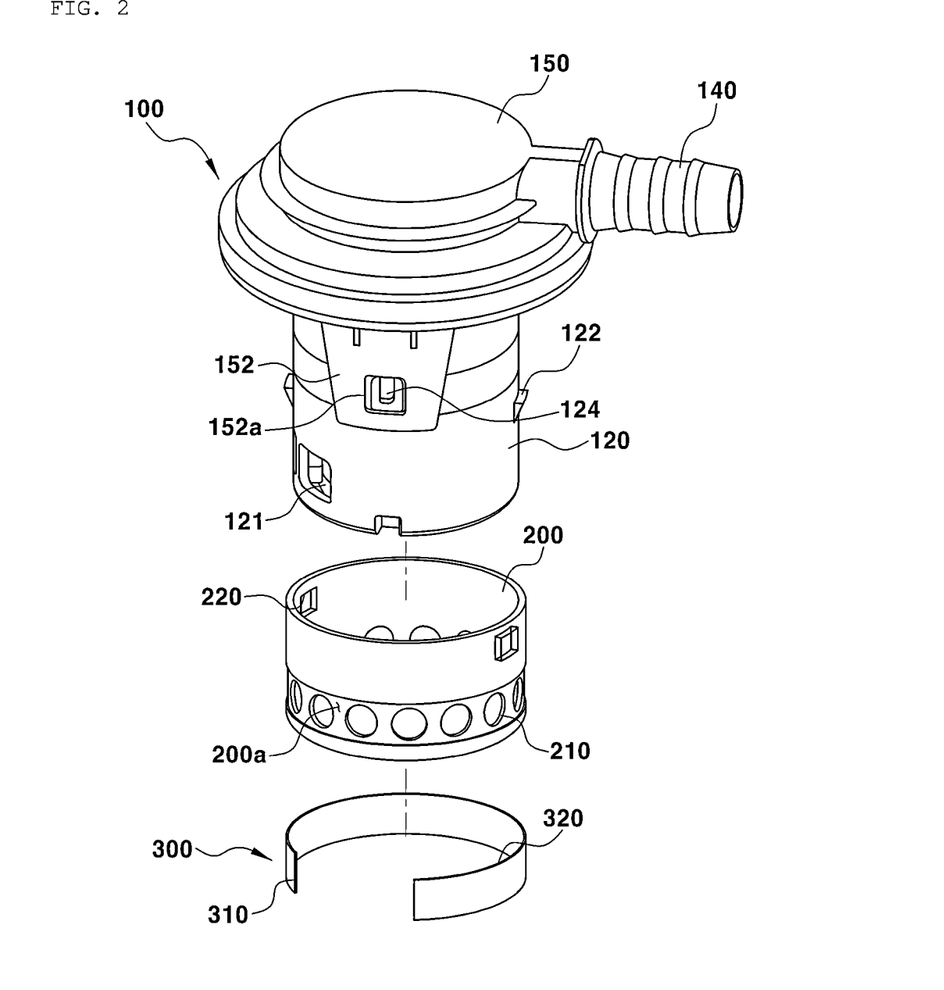
FIG. 2 is a view showing an exploded state of the apparatus for preventing fuel overflow of a vehicle fuel tank according to an embodiment of the present disclosure.
Figure 3:
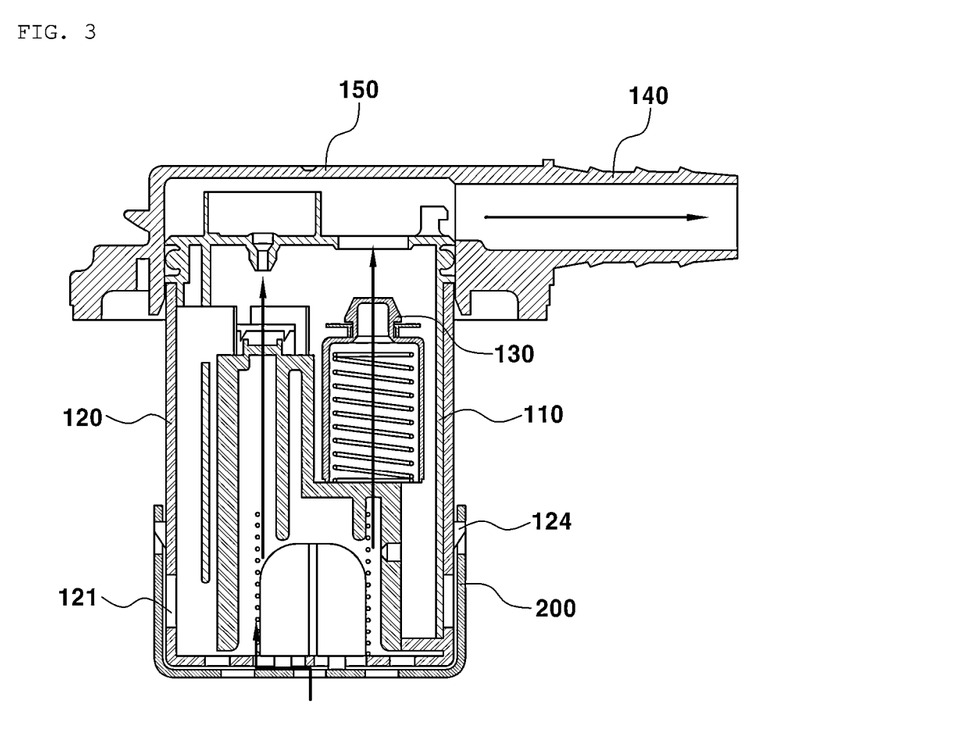
FIG. 3 is a view showing a fuel flow path for the apparatus for preventing fuel overflow of a vehicle fuel tank.

FIG. 1 is a view showing an apparatus for preventing fuel overflow of a vehicle fuel tank according to an embodiment of the present disclosure, FIG. 2 is a view showing an exploded state of the apparatus for preventing fuel overflow of a vehicle fuel tank according to an embodiment of the present disclosure, and FIG. 3 is a view showing a fuel flow path for the apparatus for preventing fuel overflow of a vehicle fuel tank.

Figure 4:
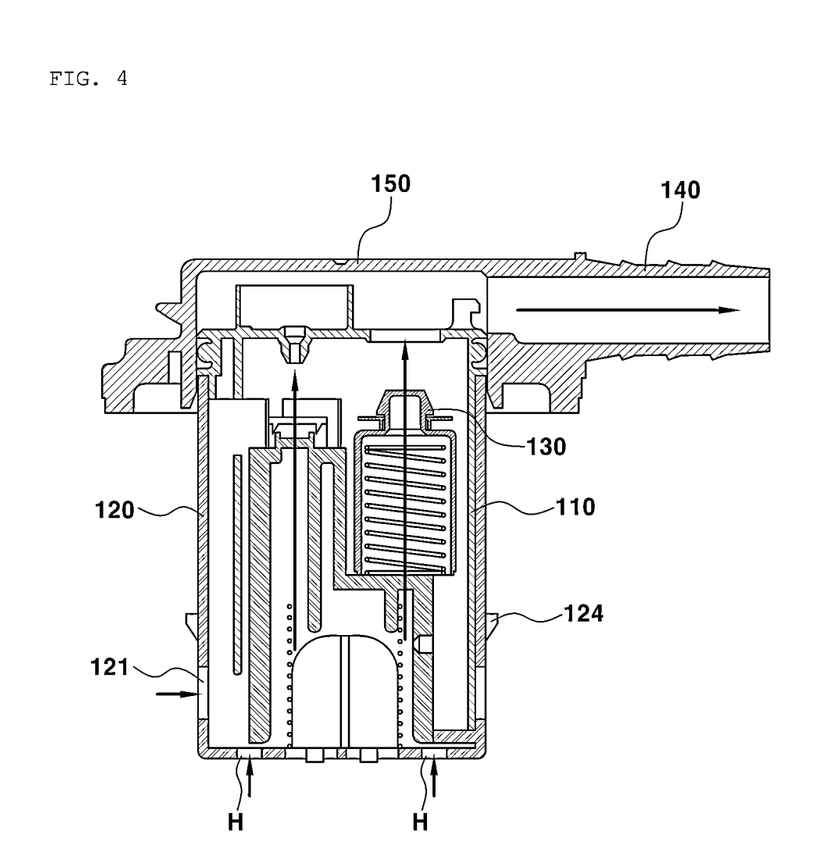
FIG. 4 is a view showing a conventional fuel flow path with respect to a fuel flow path of the apparatus for preventing fuel overflow of a vehicle fuel tank.
Figure 5:
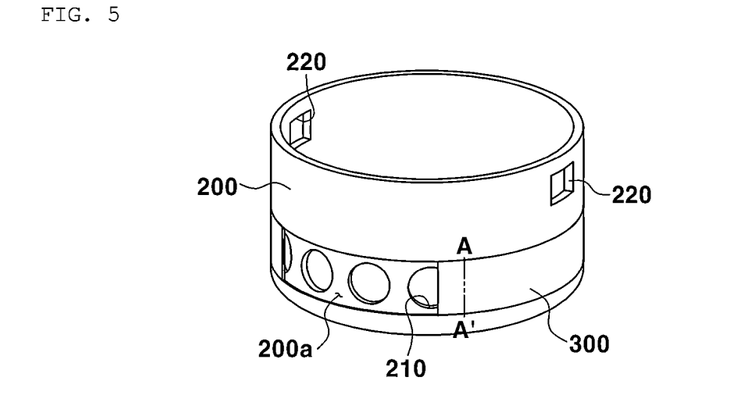
FIG. 5 is a view showing coupling of a cover unit and a shielding unit for the apparatus for preventing fuel overflow of a vehicle fuel tank.
Figure 6:
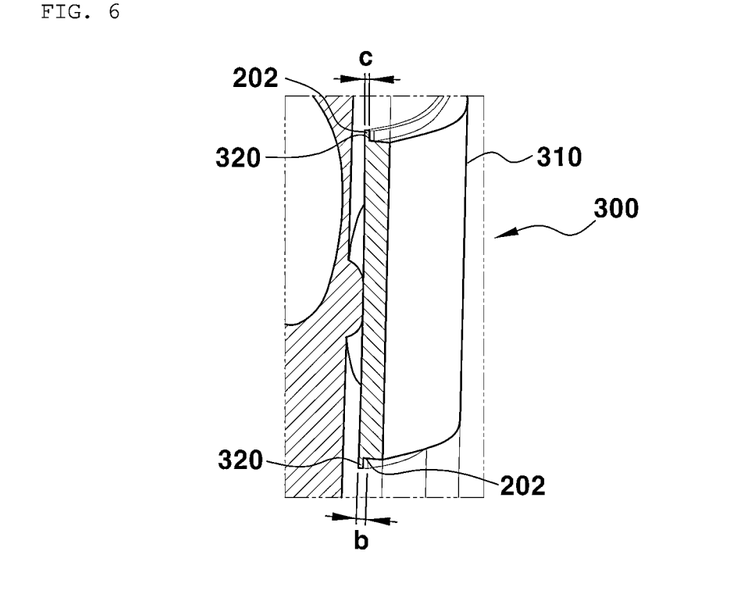
FIG. 6 is a view showing a cross section taken along line A-A' in FIG. 5 for the apparatus for preventing fuel overflow of a vehicle fuel tank.

In addition, FIG. 4 is a view showing a conventional fuel flow path with respect to a fuel flow path of the apparatus for preventing fuel overflow of a vehicle fuel tank, FIG. 5 is a view showing coupling of a cover unit and a shielding unit for the apparatus for preventing fuel overflow of a vehicle fuel tank, and FIG. 6 is a view showing a cross section taken along line A-A' in FIG. 5 for the apparatus for preventing fuel overflow of a vehicle fuel tank.

Figure 7:
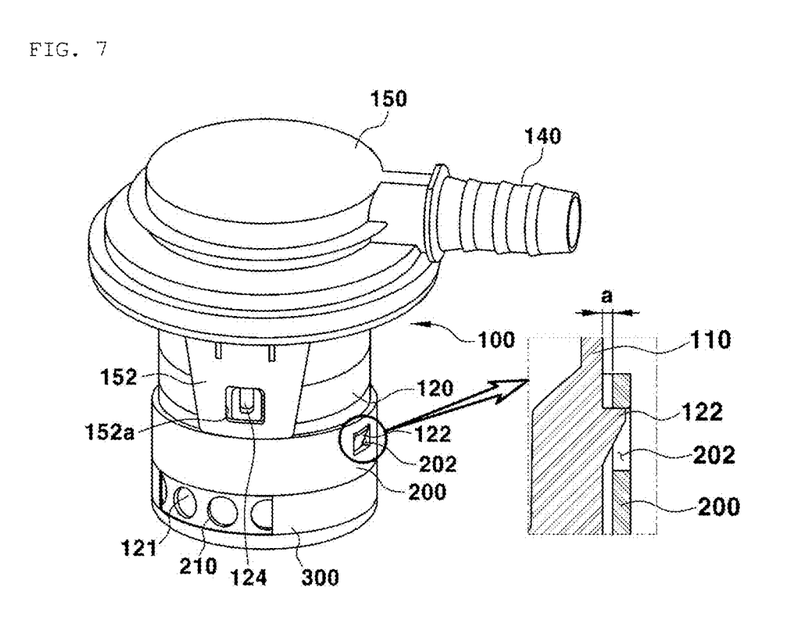
FIG. 7 is a view showing a coupling state of the cover unit for the apparatus for preventing fuel overflow of a vehicle fuel tank.
Figure 8:
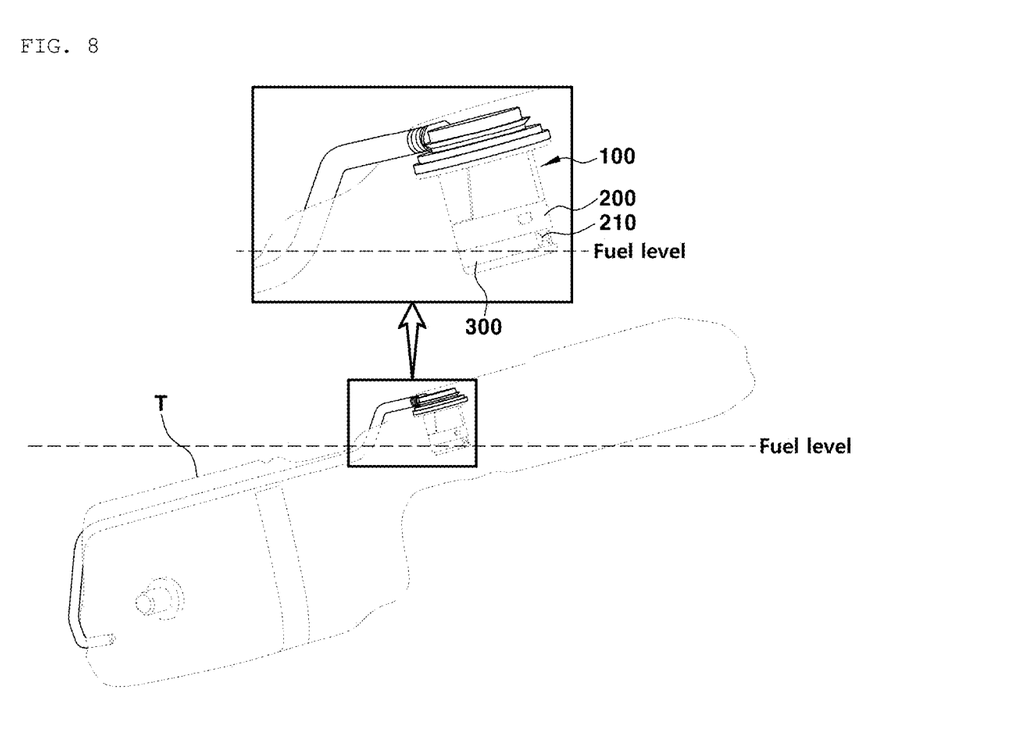
FIG. 8 is a view showing rotation of the cover unit in a right turning direction with respect to the apparatus for preventing fuel overflow of a vehicle fuel tank.
Figure 9:
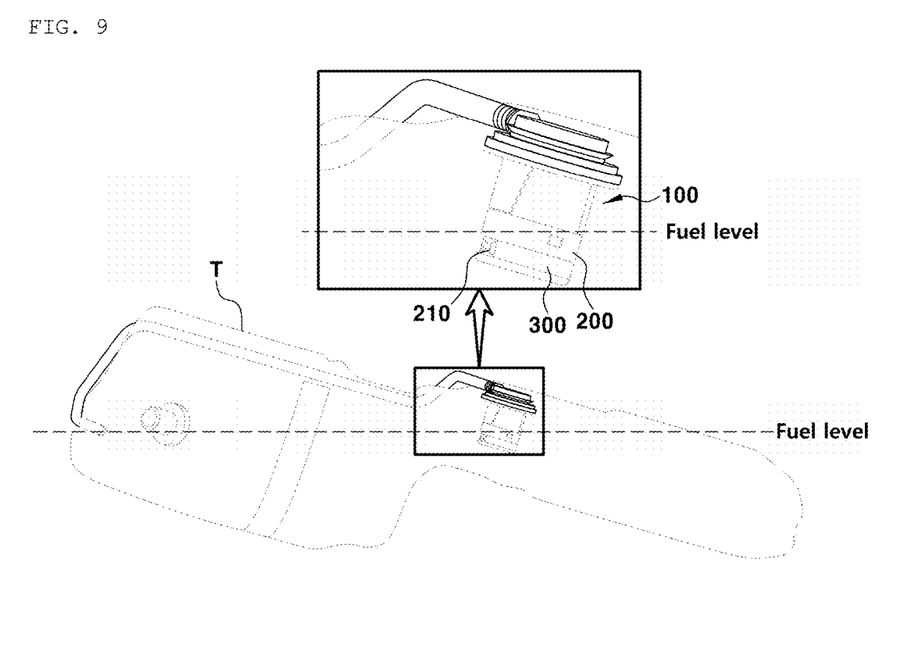
FIG. 9 is a view showing rotation of the cover unit in a left turning direction with respect to the apparatus for preventing fuel overflow of a vehicle fuel tank.

In addition, FIG. 7 is a view showing a coupling state of the cover unit for the apparatus for preventing fuel overflow of a vehicle fuel tank, FIG. 8 is a view showing rotation of the cover unit in a right turning direction with respect to the apparatus for preventing fuel overflow of a vehicle fuel tank, and FIG. 9 is a view showing rotation of the cover unit in a left turning direction with respect to the apparatus for preventing fuel overflow of a vehicle fuel tank.

With reference to FIGS. 1-3, the apparatus for preventing fuel overflow of a vehicle fuel tank according to the present embodiment includes a valve unit 100, a cover unit 200, and a shielding unit 300.

The valve unit 100 includes a valve body 110, a housing 120 configured to cover a lower part of the valve body 110, a float 130 mounted on the valve body 110 and configured to slide up and down, and a vapor line 140 selectively connected to a canister side by being opened and closed according to a movement of the float 130. The valve unit 100 further includes a fuel inlet hole 121 provided on a side surface of the housing 120 (refer to FIGS. 3 to 4).

The valve unit 100 further includes a valve cap 150 configured to cover and protect an upper end of the valve body 110. The valve cap 150 is connected to the vapor line 140 and may be fixed to a position such that a fastening groove 152a of a coupling member 152 thereof extending toward the housing 120 is positioned by being hooked on a latching piece 124 protruding from an outer circumferential surface of the housing 120.

In one example structure of the valve unit 100 including the above configuration, the float 130 may slide up and down due to buoyancy according to the height of the fuel introduced into the fuel inlet hole 121 as shown in FIG. 3.

In other words, when the fuel inside the fuel tank T rises to a preset height, the fuel flows into the window 210 and passes between an inner circumferential surface of the cover unit 200 and the housing 120 and flows into a fuel inlet hole 121 (refer to the direction of the arrow in FIG. 3). Accordingly, the float 130 moves upward from the inside of the housing 120 due to the buoyancy to close the vapor line 140.

When the fuel inside the fuel tank T is filled with an amount less than a preset amount, the float 130 moves to a lower side (i.e., downward), and the vapor line 140 is opened. In the case of a vent valve of a conventional tank T, fuel flows into the open vapor line 140 as flow of the fuel becomes abrupt, such as when the vehicle is suddenly braked or stopped, turned in the left or right direction, or the like, thereby causing the fuel to flow into the open vapor line 140 to cause fuel leakage.

In other words, as shown in FIG. 4, when the flow of fuel becomes abrupt during instances such as when the vehicle is suddenly braked or stopped, turned in the left or right direction, or the like, the fuel inlet hole 121 provided on an outer circumferential surface of the housing 120 is exposed to the outside. Lower holes H of the housing 120 are also exposed to the outside. When the fuel is introduced inside through the fuel inlet hole 121 and the lower holes H, the fuel is introduced into the open vapor line 140, thus causing fuel leakage.

In order to prevent such a problem in advance, the cover unit 200 is coupled to the housing 120 in such a way to envelop the housing 120. The cover unit 200 is provided with a plurality of windows 210 at equal intervals along an outer circumferential surface at a height corresponding to the fuel inlet hole 121, thereby being formed to allow the fuel to be selectively introduced into the valve unit 100 while sequentially passing through a predetermined inflow path, i.e., the window 210 and the fuel inlet hole 121.

As shown in FIG. 7, the cover unit 200 is formed in a shape corresponding to a diameter of the housing 120 and coupled with an outer circumferential surface of the housing 120. Latching members 122 protruding from the housing 120 are positioned to be hooked to guide grooves 220 provided on an outer circumferential surface thereof, respectively, thereby allowing fixing with respect to coupling positions to be accomplished.

Each of the latching members 122 may have an upper surface protruding with a predetermined length to support the inside of an associated one of the guide grooves 220 (see an enlarged drawing in FIG. 7). Accordingly, when the latching members 122 are hooked on the cover unit 200, a predetermined gap "a" may be formed between an outer circumferential surface of the housing 120 and an inner circumferential surface of the cover unit 200.

In addition, the cover unit 200 may be formed with a diameter larger than the diameter of the housing 120 such that the inner circumferential surface thereof is spaced apart from the outer circumferential surface of the housing 120 at a level of the gap "a" when the latching members 122 are hooked on the guide grooves 220, respectively.

The cover unit 200 is coupled with, by being hooked on, the housing 120 in a state in which the gap "a" is formed, so even when the windows 210 of the cover unit 200 are shielded through the shielding unit 300, ventilation to the inside of the valve unit 100 is made through the gap "a". Accordingly, this is to relieve the pressure inside the fuel tank T by allowing the fuel boil-off gas generated in the fuel tank T to be discharged.

As shown in FIG. 6, the shielding unit 300 is mounted on the outer circumferential surface of the cover unit 200 to selectively shield the open windows 210 and, in a state of being mounted on the cover unit 200, rotates along a turning direction of the vehicle to form an inflow path of the fuel flowing into the fuel inlet hole 121.

To this end, the shielding unit 300 includes a body portion 310 and coupling protrusion parts 320.

The body portion 310 is mounted on a mounting area 200a of the cover unit 200 provided with the windows 210.

In addition, the body portion 310 is provided with a length shorter than a circumferential length of the cover unit 200 when opposite end parts are spaced apart from each other, thereby being mounted on the mounting area 200a and is formed to be able to shield some of the windows 210 including at least one of the plurality of windows 210 when rotating on the mounting area 200a.

The coupling protrusion parts 320 are formed to protrude from an upper portion and a lower portion of the body portion 310, respectively, and are provided to be inserted into latching grooves 202 of the mounting area 200a, respectively.

In addition, each of the coupling protrusion parts 320 is formed with a width c shorter than a width b of an interior of associated one of the latching groove parts 202 (see FIG. 6). This allows the body portion 310 to be easily rotatable in the mounting area 200a by gravity and acceleration acting thereon in the turning direction of the vehicle.

When the vehicle is biased in the turning direction, the fuel level also rises along the corresponding direction. Accordingly, the body portion 310 rotates along the mounting area 200a by the structural features of the coupling protrusion parts 320 to shield the fuel inlet hole 121, thereby preventing the fuel from being rapidly introduced by the raised fuel level in advance and reducing the possibility that the fuel may be introduced into the vapor line 140 and guided to the canister.

The fuel inlet hole 121 is typically formed to be biased toward one side of the housing 120, and the fuel tank T is tilted by the turning direction of the vehicle, thereby rotating the body portion 310 to face the fuel inlet hole 121. Accordingly, the windows 210 may be shielded through the shielding unit 300 so that the fuel may be blocked from being directly introduced through the fuel inlet hole 121.

In addition, when the fuel inlet hole 121 is formed to be biased toward one side of the housing 120 in the same direction as above, as the fuel tank T is tilted by the turning direction, the body portion 310 rotates in an opposite direction to the fuel inlet hole 121. Accordingly, the windows 210 positioned opposite to the fuel inlet hole 121 may be shielded through the shielding unit 300 so that the fuel may be introduced into the fuel inlet hole 121 by passing (by being decelerated) between the inner circumferential surface of the cover unit 200 and the outer circumferential surface of the housing 120.

For example, as shown in FIG. 8, assuming that the fuel inlet hole 121 is formed to be biased toward the left side of the housing 120, when the vehicle turns in the left direction, the fuel tank T is inclined, and accordingly, the fuel level in the left part of the fuel tank T rises. In such a state, the shielding unit 300 rotates on the cover unit 200 by gravity and acceleration acting on the body part 310 according to the vehicle turning. As a result, the windows 210 at a position coincident with the fuel inlet hole 121 may be shielded through the shielding unit 300 so that the fuel may be blocked from being directly introduced through the fuel inlet hole 121.

On the contrary, as shown in FIG. 9, when the vehicle turns in the right direction, the fuel tank T is inclined, and accordingly, the fuel level in the right part of the fuel tank T rises. In such a state, the shielding unit 300 rotates on the cover unit 200 by gravity and acceleration acting on the body part 310 according to the vehicle turning. As a result, the windows 210 positioned opposite to the fuel inlet hole 121 may be shielded through the shielding unit 300 so that the fuel may be introduced into the fuel inlet hole 121 by passing (by being decelerated) between the inner circumferential surface of the cover unit 200 and the outer circumferential surface of the housing 120.

In addition, even when the fuel tank T is tilted backward or forward due to a sudden start or sudden stop of the vehicle, thereby causing the fuel level to rise, the shielding unit 300 rotates on the cover unit 200 by gravity and acceleration acting on the body part 310. As a result, the windows 210 may be shielded through the shielding unit 300 so that the fuel may be introduced into the fuel inlet hole 121, by being decelerated, by passing between the inner circumferential surface of the cover unit 200 and the outer circumferential surface of the housing 120.

Therefore, in the present embodiment, the shielding unit 300 is selectively rotated on the cover unit 200 by gravity and acceleration acting on the body part 310 according to the vehicle turning, so that the window 210 is shielded. Accordingly, it is possible to prevent the fuel from rapidly flowing into the inside of the valve unit 100.

In addition, the cover unit 200 and the shielding unit 300 as described above may be commonly applied to the inside of the fuel tank T in which the valve unit 100 having the same diameter as the cover unit 200 and the shielding unit 300 is mounted, thereby realizing ease of manufacture and also reducing costs at the same time.

The present disclosure is provided with a valve unit capable of being fixed to a valve body and a shielding unit mounted and capable of being rotated in the valve unit to complicate an overflowing flow path of fuel. This results in reducing a possibility for the fuel introduced into the valve unit to be guided and overflowed to the canister.

In addition, according to the present disclosure, when the vehicle turns along different turning directions, the shielding unit rotates by gravity and acceleration to block a fuel inlet hole provided in the valve unit. Accordingly, when the fuel level in the fuel tank rises in a turning direction, there is an effect of preventing in advance the problem of the fuel from flowing into the inside of the valve unit and the canister, through the fuel inlet hole.

In addition, the present disclosure may apply a configuration including a cover unit and the shielding unit to the inside of the fuel tank in which the valve unit having the same diameter as the cover unit and the shielding unit is mounted, so there is an effect of realizing ease of manufacture and also reducing costs, at the same time.

Although the present disclosure has been described with reference to the embodiment(s) shown in the drawings, this is only for example, and it should be understood by those having ordinary skill in the art that various modifications may be made therefrom, and all or parts of the embodiment(s) may optionally be combined. Accordingly, the true technical protection scope of the present disclosure should be defined by the technical spirit of the appended claims.

What is claimed is:

1. An apparatus for preventing fuel overflow of a vehicle fuel tank, the apparatus comprising:
a valve unit comprising a valve body, a housing configured to cover a lower part of the valve body, a float mounted on the valve body and configured to slide up and down, and a vapor line selectively connected to a canister side by being opened and closed according to a movement of the float, wherein a fuel inlet hole is provided on a side surface of the housing;
a cover unit coupled to the housing to envelop the housing, and comprising a plurality of windows along an outer circumferential surface thereof at a height corresponding to the fuel inlet hole, thereby being configured to allow fuel to be introduced into the valve unit; and
a shielding unit mounted on the outer circumferential surface of the cover unit to shield open windows and configured such that, when mounted on the cover unit, the shielding unit rotates along a turning direction of a vehicle to form an inflow path of the fuel flowing into the fuel inlet hole.

2. The apparatus of claim 1, wherein, when rotated to face the fuel inlet hole by the turning direction, the shielding unit shields at least some of the plurality of windows, thereby blocking the fuel from being directly introduced through the fuel inlet hole.

3. The apparatus of claim 1, wherein, when rotated in an opposite direction to the fuel inlet hole by the turning direction, the shielding unit shields at least some of the plurality of windows, thereby allowing the fuel to be introduced into the fuel inlet hole by passing between an inner circumferential surface of the cover unit and an outer circumferential surface of the housing while being decelerated.

4. The apparatus of claim 1, wherein the cover unit has a shape corresponding to a diameter of the housing, and latching members protruding from the housing are positioned to be hooked to guide grooves provided on an outer circumferential surface of the cover unit, respectively, thereby allowing fixing of the cover unit to the housing at coupling positions.

5. The apparatus of claim 4, wherein the cover unit has a diameter larger than the diameter of the housing such that an inner circumferential surface thereof is spaced apart from an outer circumferential surface of the housing when the latching members are hooked on the guide grooves, respectively.

6. The apparatus of claim 1, wherein the shielding unit comprises:
a body portion mounted on a mounting area of the cover unit having the plurality of windows; and
coupling protrusion parts protruding from an upper portion and a lower portion of the body portion, respectively, and configured to be inserted into latching grooves of the mounting area, respectively.

7. The apparatus of claim 6, wherein the body portion mounted on the mounting area of the cover unit has a length shorter than a circumferential length of the cover unit when opposite end parts thereof are spaced apart from each other.

8. The apparatus of claim 6, wherein each of the coupling protrusion parts has a width shorter than a width of an interior of associated one of the latching grooves, thereby allowing the body portion to be rotatable in the mounting area by gravity and acceleration acting thereon in the turning direction.

* * * * *